United States Patent
Chang et al.

(10) Patent No.: US 6,665,485 B2
(45) Date of Patent: Dec. 16, 2003

(54) VARIABLE OPTICAL ATTENUATOR

(75) Inventors: Yao-Hao Chang, Tu-Chen (TW); Kun-Tsan Wu, Tu-Chen (TW)

(73) Assignee: Hon Hai Precision Ind. Co., LTD,, Taipei Hsien (TW)

( * ) Notice: Subject to any disclaimer, the term of this patent is extended or adjusted under 35 U.S.C. 154(b) by 58 days.

(21) Appl. No.: 09/994,433

(22) Filed: Nov. 26, 2001

(65) Prior Publication Data
US 2002/0181930 A1 Dec. 5, 2002

(30) Foreign Application Priority Data
May 30, 2001 (TW) .................................... 90208824 U

(51) Int. Cl.$^7$ ................................................ G02B 6/32
(52) U.S. Cl. ....................................................... 385/140
(58) Field of Search ............................... 385/27, 25, 39, 385/140

(56) References Cited

U.S. PATENT DOCUMENTS

| | | | | |
|---|---|---|---|---|
| 4,591,231 A | * | 5/1986 | Kaiser et al. | 385/140 |
| 6,055,104 A | * | 4/2000 | Cheng | 385/140 |
| 6,130,984 A | * | 10/2000 | Shen et al. | 385/140 |
| 6,137,941 A | * | 10/2000 | Robinson | 385/140 |
| 6,173,106 B1 | * | 1/2001 | DeBoynton et al. | 385/140 |
| 6,181,846 B1 | * | 1/2001 | Pan | 385/140 |
| 6,266,474 B1 | * | 7/2001 | Han et al. | 385/140 |
| 6,304,709 B1 | * | 10/2001 | Fujita | 385/140 |
| 6,360,032 B1 | * | 3/2002 | Berger et al. | 385/140 |
| 2003/0049011 A1 | * | 3/2003 | Chang | 385/140 |

* cited by examiner

Primary Examiner—Michael P. Stafira
Assistant Examiner—Juan D Valentin, II
(74) Attorney, Agent, or Firm—Wei Te Chung

(57) ABSTRACT

A variable optical attenuator (10) of the present invention includes a cover (2), a housing (3), an optical module (4), a reciprocating means (5), and a filter (9). The reciprocating means, optical module, and filter are assembled in the housing. The reciprocating means includes a carrier (53) mounted to a rotatable screw rod (55). The filter has a varying optical density gradient over one of its dimensions and mounts on the carrier. Light signals are transmitted from an input optical fiber (45) through the filter and are reflected off a reflector (42) of the optical module to pass again through the filter to an output optical fiber (46). When the screw rod is rotated, the carrier with the filter mounted on it moves toward one side of the housing or another, varying the attenuation of the light signals. The screw rod can be rotated using a screwdriver through a side hole (33,34) on either side of the housing.

20 Claims, 6 Drawing Sheets

VARIABLE OPTICAL ATTENUATOR

BACKGROUND OF THE INVENTION

1. Field of the Invention

The present invention relates to a variable attenuator for use in optical fiber communication and optical network technology, and particularly to a variable attenuator with an adjusting mechanism controllable from two different locations on the variable attenuator.

2. Description of Related Art

A fiber optic attenuator is a passive optical component for reducing optical power propagating in a fiber, and may perform fixed or variable attenuation. Optical attenuators are widely used in optical transmission systems and optical networks.

A variable attenuator generally has an optical filter. The filter has an effective filtering region disposed in the optical path between a collimator and a reflector. The filter has a filter density which increases from a lower density region to a higher density region. The transmitted light is attenuated to different intensities by linear movement of the filter.

One prior art variable optical attenuator features a rotateable screw rod as the attenuation adjusting mechanism. The screw rod is threadedly engaged with a carrier, and a variable density filter is mounted on top of the carrier. The carrier (and filter) moves from side to side, the filter being in the path of the light beam. The direction of movement of the carrier and filter depends on the direction of rotation of the screw rod. The screw rod of this prior art optical attenuator has an operating surface at only one side of the attenuator. Therefore, the adjusting mechanism of this attenuator is operable at only one location on the side of the attenuator. Use of this attenuator, therefore, is limited to locations where enough space exists on the side of the attenuator where the adjusting mechanism is adjusted.

An improved optical attenuator having an adjusting mechanism which allows operation from two different locations on the attenuator is desired.

BRIEF SUMMARY OF THE INVENTION

An object of the present invention is to provide an improved variable attenuator having an adjusting mechanism which is operable from at least two adjusting locations on the attenuator.

Another object of the present invention is to provide an improved variable attenuator that can be used in a larger number of circumstances.

The present invention is a variable optical attenuator having an adjusting mechanism operable from two opposite sides of the variable attenuator. Specifically, the variable optical attenuator comprises a housing, an optical module, a reciprocating means, and a filter.

The housing has an inner cavity. A pair of side holes penetrates the housing at each side of the inner cavity and provides communication between the inner cavity and two outer sides of the housing.

The optical module comprises a frame, a reflector and a collimator. The frame has a groove with an inner wall, and a through hole communicating with the groove. The reflector is fixed on the inner wall of the frame and is disposed coaxially with the through hole. The collimator is positioned in the through hole and fixes ends of an input optical fiber for carrying transmission optical signals to the attenuator and an output optical fiber for receiving the resulting attenuated transmission optical signals from the attenuator.

The reciprocating means comprises a carrier and a screw rod. The screw rod has a screw portion at its middle and a pair of gripping portions at either end of the screw portion. An operating surface in the form of a slot is located at each end of the screw rod.

When assembled, the two ends of the screw rod fit into and are accessible at the side holes at either side of the housing, and the carrier is movable within the inner cavity and engages with the screw rod. The filter fits on the carrier and is positioned between the collimator and the reflector. The carrier moves lengthwise along the screw rod when the screw rod is rotated. The filter moves along with the carrier. Since the screw rod has operating surfaces on each of its ends, the adjusting mechanism of the variable attenuator is operable from two opposite sides of the housing.

Other objects, advantages and novel features of the invention will become more apparent from the following detailed description when taken in conjunction with the accompanying drawings.

DETAILED DESCRIPTION OF THE INVENTION

Figure 1:
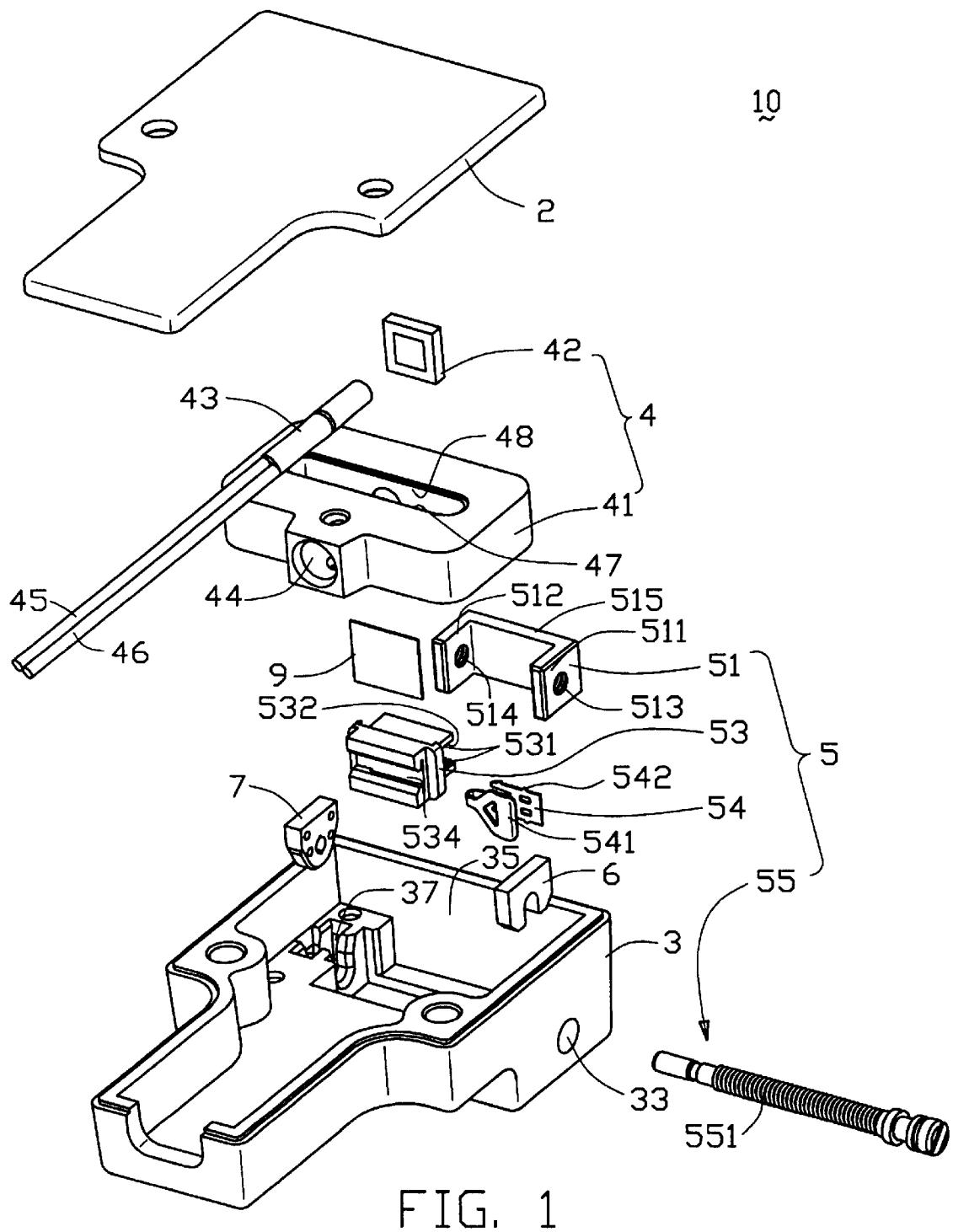
FIG. 1 is an exploded view of a variable optical attenuator of the present invention.
Figure 2:
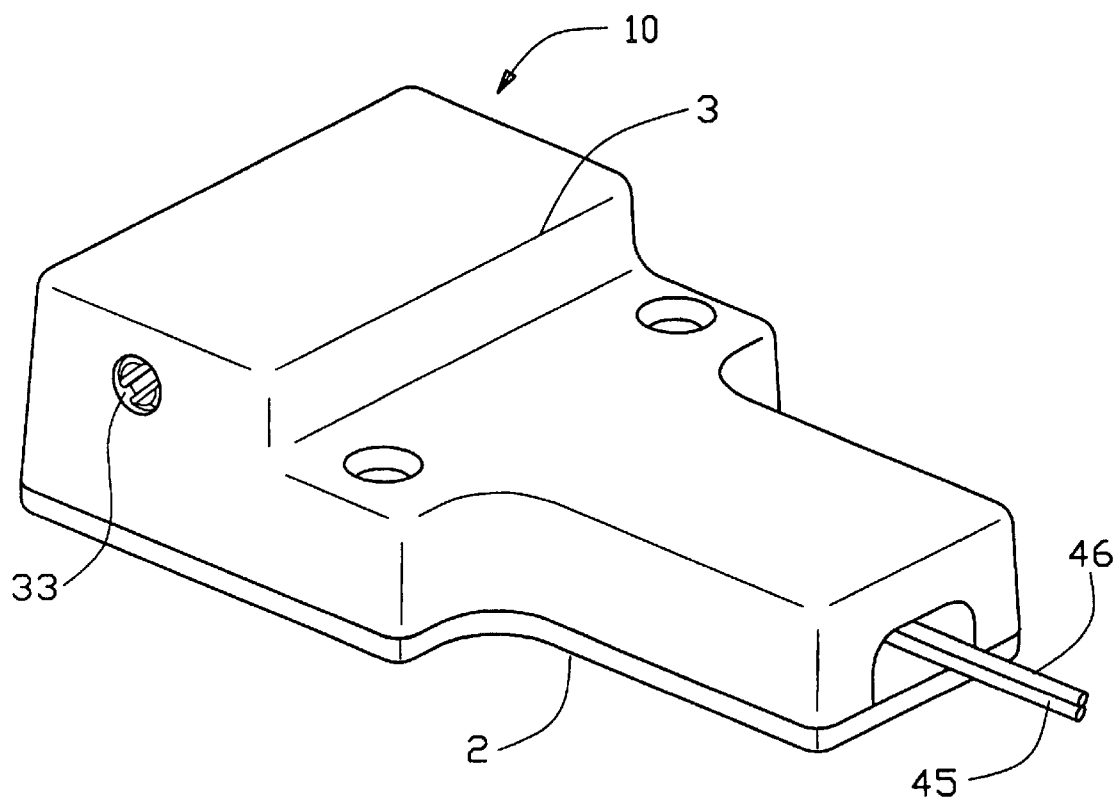
FIG. 2 is a perspective, assembled view of the variable optical attenuator of FIG. 1, viewed from a right side, bottom-aspect.
Figure 3:
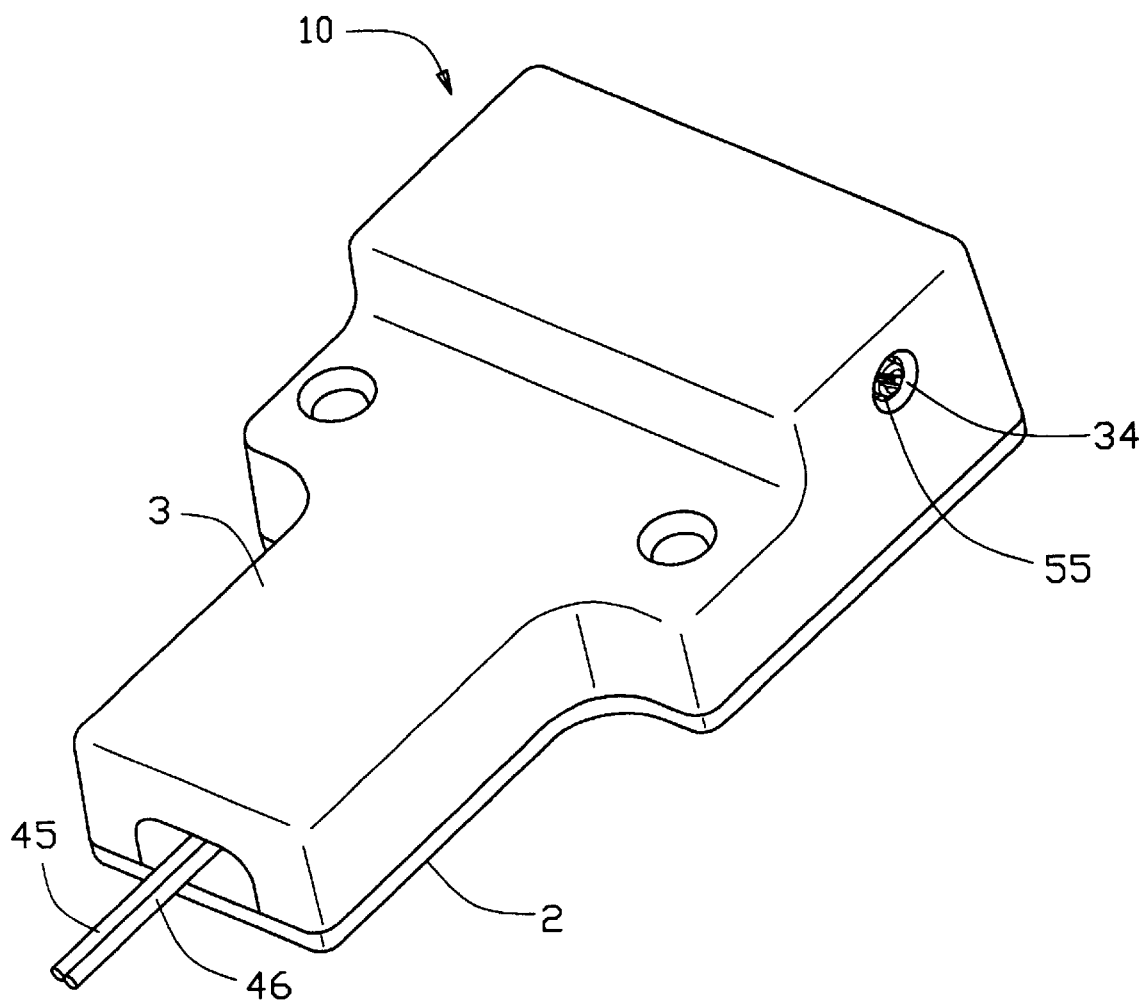
FIG. 3 is a perspective, assembled view of the variable optical attenuator of FIG. 1, viewed from a left side, bottom-aspect.

As shown in FIG. 1, FIG. 2 and FIG. 3, a variable optical attenuator 10 of the present invention comprises a cover 2, a housing 3, an optical module 4, a reciprocating means 5, a clamp 6, a fixer 7 and a filter 9.

Referring to FIG. 1, FIG. 2, FIG. 3 and FIG. 4, the housing 3 has an inner cavity 35 and a pair of receiving cavities 37, 38 positioned at both sides of and communicating with the inner cavity 35. A side hole 33,34 is positioned to an outside of each respective receiving cavity 38,37 and communicates between the corresponding receiving cavity 38,37 and an outer side of the housing 3. An inner sidewall 36 defines a front wall of the inner cavity 35.

As shown in FIG. 1, the optical module 4 comprises a frame 41, a reflector 42, and a collimator 43. The frame has a groove 47 defined through a middle thereof between an upper side (not labeled) and a lower side (not labeled) of the frame 41. An inner wall 48 defines a rear side (not labeled) of the groove 47. A through hole 44 is defined from a front side (not labeled) of the frame 41 to the groove 47. The reflector 42 is fixed to the inner wall 48 of the frame 41 and is disposed coaxially with the through hole 44. An input optical fiber 45 and an output optical fiber 46 are fixed to the collimator 43, which is fixed in the through hole 44.

Figure 4:
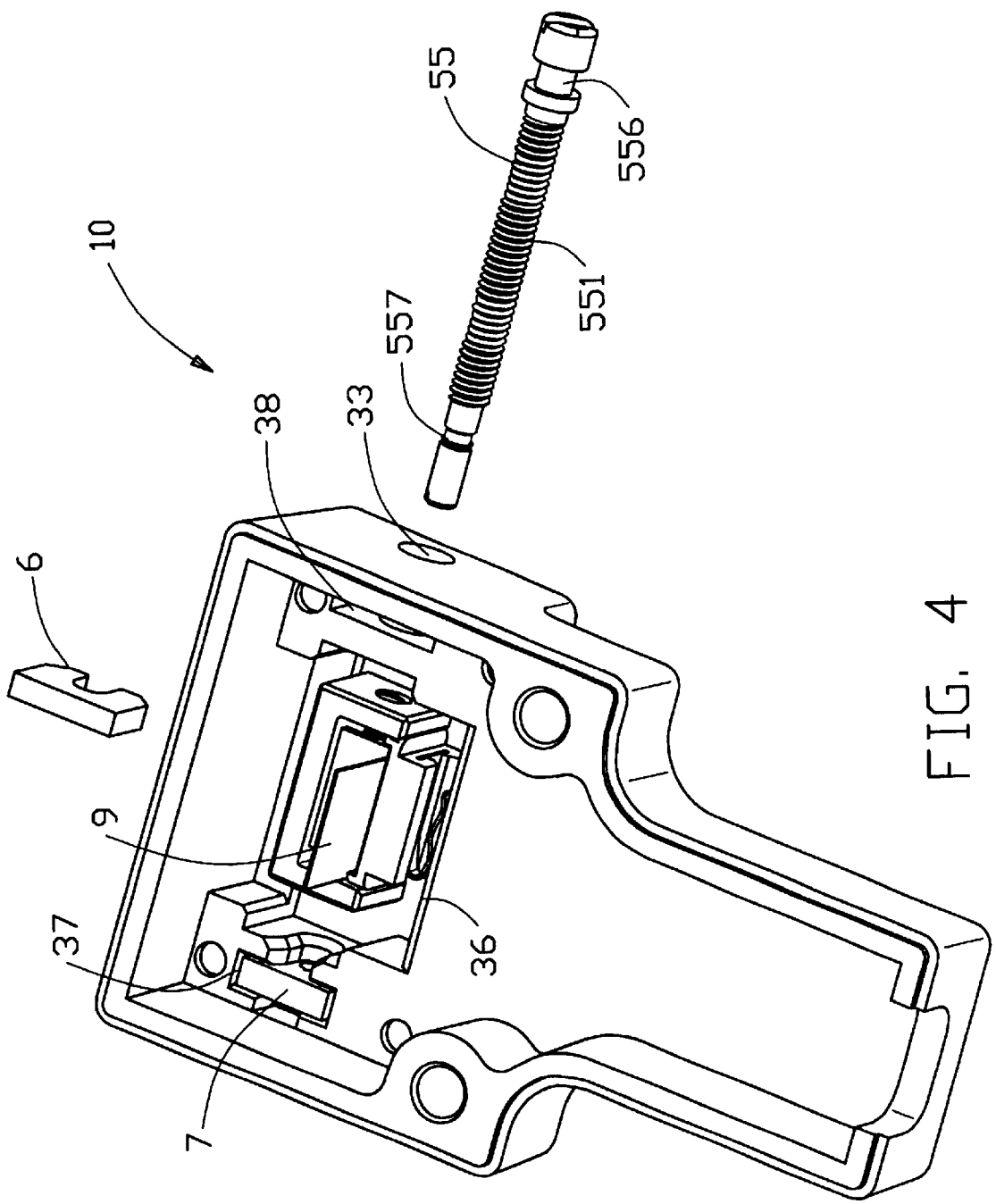
FIG. 4 is a partially assembled view of FIG. 1, without an optical module or a cover.
Figure 5:
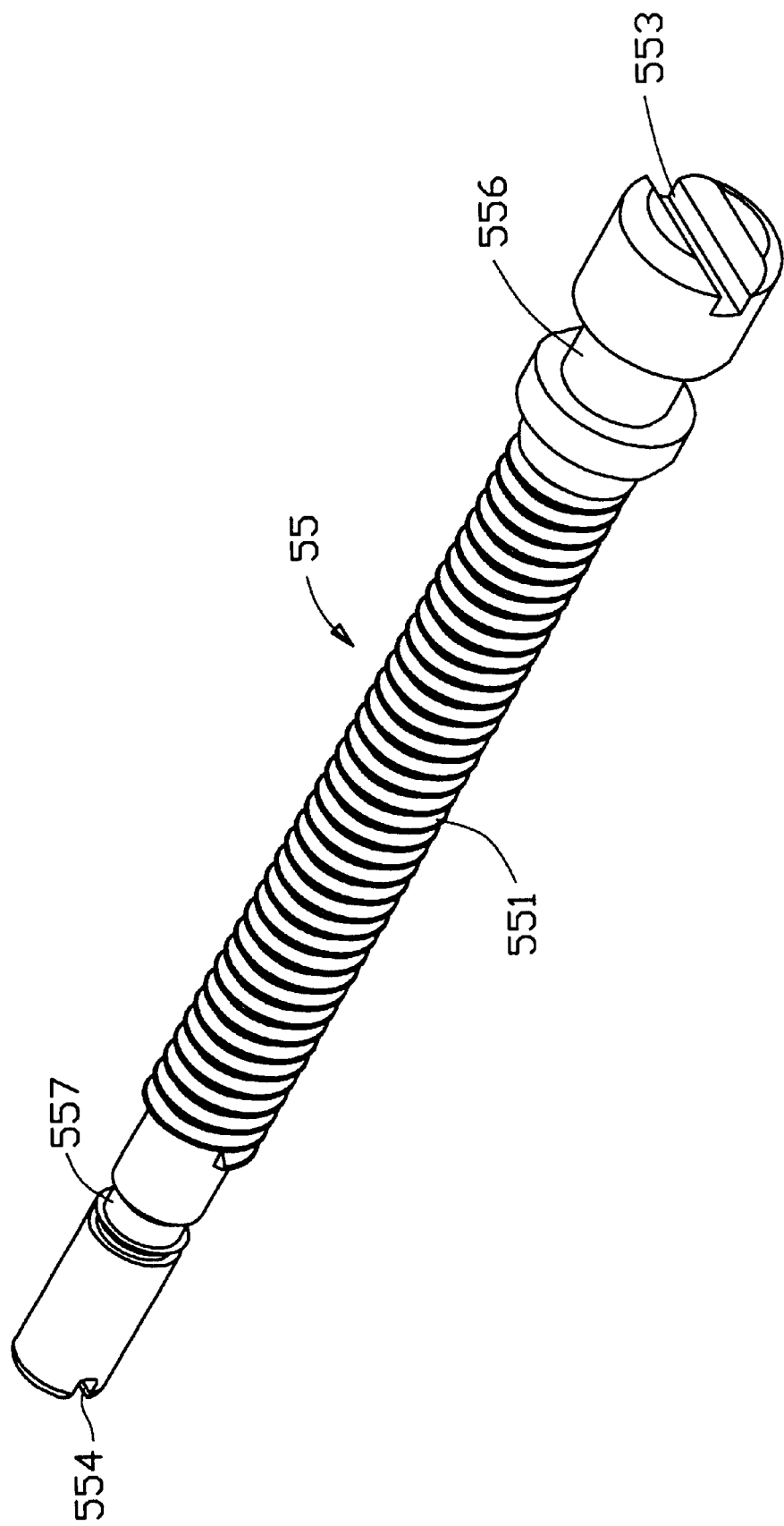
FIG. 5 is a perspective view of a screw rod of the variable optical attenuator of the present invention.

The filter 9 has a varying optical density gradient along at least one of its dimensions. As shown in FIG. 1, FIG. 4, FIG.

Figure 6:
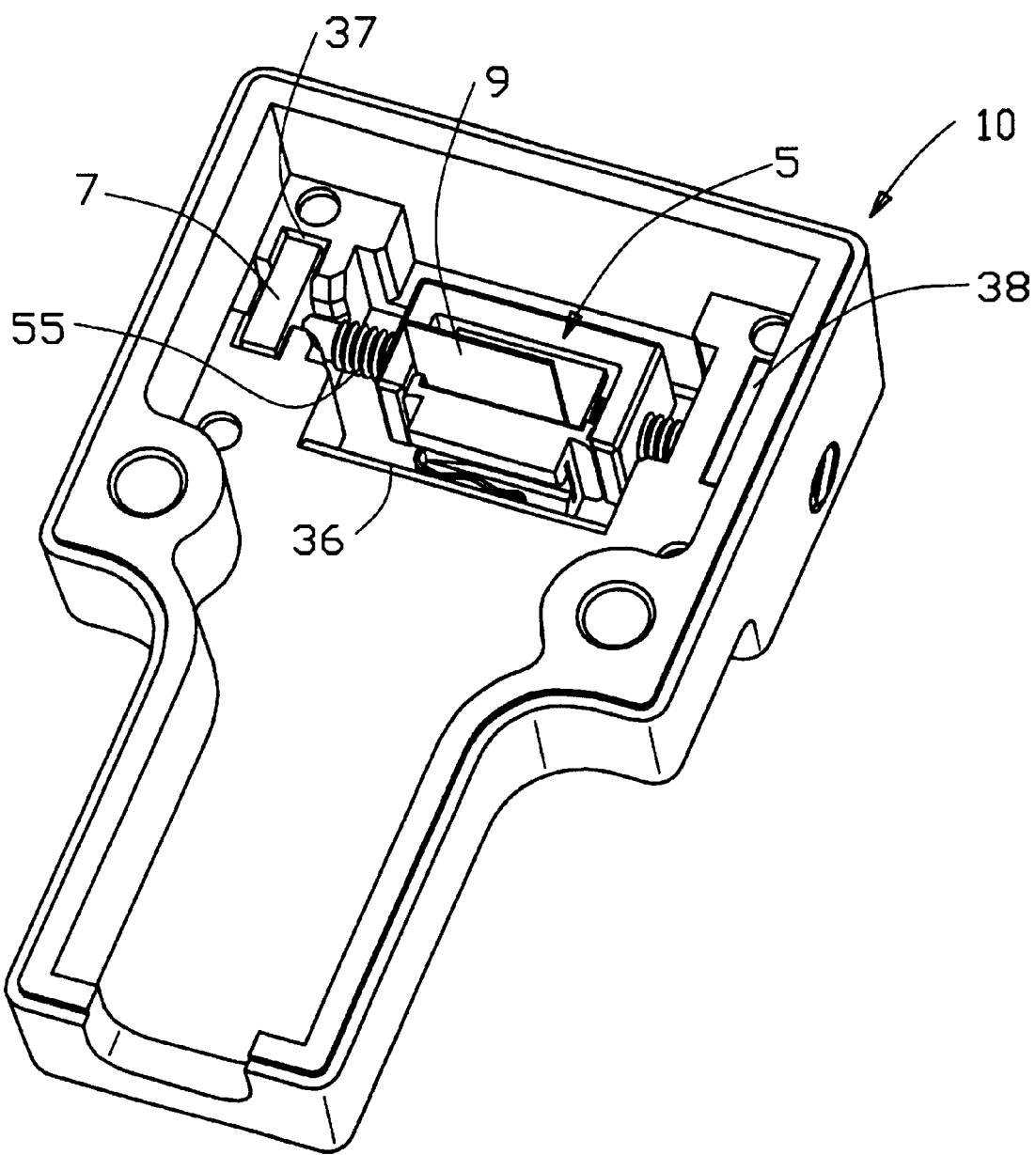
FIG. 6 is an assembled view of FIG. 4.

5 and FIG. 6, the reciprocating means 5 for moving the filter 9 comprises a stopper mechanism 51, a carrier 53, a spring element 54, and a screw rod 55. The carrier 53 carries the filter 9 and moveably mounts on the screw rod 55. The carrier 53 has a set of internal threads 531 lining a rear slot 532 and a fixing groove 534 on a front side (not labeled) of the carrier 53. The stopper mechanism 51 comprises a stopper body 515, a first stopper block 511, and a second stopper block 512. Each stopper block 511,512 has a screw hole 513,514. The stopper mechanism 51 is used to prevent the carrier 53 from moving too far to either side of the screw rod 55. The spring element 54 has a fixing portion 542 and a mating portion 541. The screw rod 55 has a screw portion 551 formed along a middle portion thereof and a holding portion (not labeled) at each end thereof. A pair of slots 553, 554 is positioned at opposite ends of the screw rod 55. A pair of gripping portions 556, 557 is positioned between the ends of the screw portion 551 and the slots 553, 554.

As shown in FIGS. 1 and 6, in assembly, the stopper mechanism 51 is positioned around three sides of the carrier 53. The filter 9 is fixed onto the carrier 53 and the fixing portion 542 of the spring element 54 is inserted into the fixing groove 534 of the carrier 53. The carrier 53 fits into the inner cavity 35 and the fixer 7 fits into the receiving cavity 37. The screw rod 55 is sequentially inserted through the side hole 33 of the housing 3, the screw hole 513 of the stopper mechanism 51, the rear slot 532 of the carrier 53, the screw hole 514, a through hole (not labeled) of the fixer 7, and the side hole 34 of the housing 3. One gripping portion 557 is disposed in the through hole (not labeled) of the fixer 7 and the other gripping portion 556 is disposed in the receiving cavity 38 of the housing 3. The screw portion 551 of the screw rod 55 threadedly engages with the screw holes 513, 514 of the stopper mechanism 51 and with the internal threads 531 of the carrier 53. The clamp 6 is assembled in the receiving cavity 38, stably fixing the screw rod 55 in the housing 3. The carrier 53 is thereby positioned within the inner cavity 35 with the mating portion 541 of the spring element 54 abutting against the inner sidewall 36 of the housing 3. The mating portion 541 of the spring element 54 moves along the inner sidewall 36 when the carrier 53 moves. The screw rod 55 is rotatable about a longitudinal axis thereof and can be rotated using the slot 553, which is accessible through the side hole 33, or using the slot 554, which is accessable through the side hole 34. The optical module 4 is assembled in the housing 3 with the filter 9 protruding into the groove 47 in front of the reflector 42. The input optical fiber 45 and output optical fiber 46 protrude from a front end of the housing 3. The cover 2 is fixed to a top surface of the housing 3.

Referring to FIG. 6, in use, optical signals are transmitted from the input optical fiber 45 through the collimator 43 and through the groove 47 to pass through the filter 9. These optical signals are reflected by the reflector 42, and pass again through the filter 9 and the collimator 43, in a reverse direction, and are transmitted through the output optical fiber 46. When the screw rod 55 is rotated in one direction about its longitudinal axis, the carrier 53 and filter 9 move toward the receiving cavity 37. When the screw rod 55 is rotated in an opposite direction, the carrier 53 and the filter 9 move toward the receiving cavity 38. The direction of movement of the filter 9 is perpendicular to the path of the input and output optical signals. The filter 9 has an optical density gradient which varies between a lower density region and a higher density region along a direction parallel to the direction of movement of the filter 9. When the carrier 53 moves to either end of the screw rod 55, a corresponding stopper block 511, 512 of the stopper mechanism 51 abuts against a wall (not labeled) adjacent the corresponding receiving cavity 38, 37, and the filter 9 stops its linear motion with either the lower density region or the higher density region being in the path of transmission of the optical signals coming from the input optical fiber 45 and going to the output optical fiber 46.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A variable optical attenuator for attenuating optical signals input from an input optical fiber and output to an output optical fiber, comprising:
   a housing;
   a filter having a varying optical density gradient along at least one of its dimensions; and
   a reciprocating means coupled to the filter and moveable within the housing to actuate movement of the filter along a direction parallel to the at least one dimension over which the optical density gradient of the filter varies, wherein said reciprocating means has a stopper mechanism moving with said filter, said stopper mechanism has two stopper blocks which abut against a wall of said housing to stop said filter with either a lower density region or a higher density region being in a path of transmission of the optical signals; and
   at least two adjusting controls disposed on two opposite transverse sides of the housing to adjustably move said reciprocating means with accessibility from said two sides respectively.

2. The variable optical attenuator as claimed in claim 1, wherein the variable optical attenuator further comprises an optical module and said optical module comprises a frame.

3. The variable optical attenuator as claimed in claim 2, wherein said frame has a groove defined through at least one side of the frame and a through hole defined through another side of the frame and in communication with the groove.

4. The variable optical attenuator as claimed in claim 3, wherein said variable optical attenuator further comprises a collimator and said collimator fixes ends of the input optical fiber and the output optical fiber and is positioned in the through hole.

5. The variable optical attenuator as claimed in claim 4, wherein said variable optical attenuator further comprises a reflector, said reflector is fixed on an inner wall of the groove opposite to and aligned to be substantially normal with an axis of the collimator, and the filter is positioned between the reflector and the collimator.

6. The variable optical attenuator as claimed in claim 2, further comprising at least one fastening means to fix said optical module and said reciprocating means in an interior space of said housing.

7. The variable optical attenuator as claimed in claim 1, wherein said reciprocating means has a carrier for mounting said filter, a spring element one portion of which is inserted in a groove of the carrier and another portion of which abuts against and can move alone an inner sidewall of the housing, and a screw rod.

8. The variable optical attenuator as claimed in claim 7, wherein said housing has at least one side hole, said stopper has at least one screw hole, said carrier has internal threads therein, and said screw rod is rotatably inserted through and engages with the side hole, the screw hole and the internal threads.

9. The variable optical attenuator as claimed in claim 7, wherein said at least two adjusting controls is a pair of slots, one positioned at each of two ends of the screw rod.

10. The variable optical attenuator as claimed in claim 9, wherein each slot is accessible from a different side of the housing and can be operated by a screwdriver.

11. A variable optical attenuator for attenuating optical signals input from an input optical fiber and output to an output optical fiber, comprising:

a housing with an interior space therein and at least one side hole positioned at one side of the housing and communicating with said interior space;

an optical module comprising a frame for mounting a reflector, and a collimator for fixing said fibers;

a filter having a filter density which varies between a lower density region and a higher density region; and a reciprocating means coupled to the filter which provides a stable linear movement of itself and the filter, wherein said reciprocating means has at least two adjusting controls and further comprises a carrier for mounting the filter, a stopper for restraining the movement of said carrier, and a screw rod, wherein said screw rod rotatably and threadedly engages with said side hole of the housing, the stopper and the carrier, whereby the optical module and the reciprocating means received in the interior space of the housing.

12. The variable optical attenuator as claimed in claim 11, wherein said frame has a groove defined through at least one side of the frame for mounting said reflector and a through hole defined through another side of the frame and in communication with the groove for receiving said collimator.

13. The variable optical attenuator as claimed in claim 12, wherein said reflector is fixed on an inner wall of the groove opposite to and aligned to be substantially normal with an axis of the collimator.

14. The variable optical attenuator as claimed in claim 11, wherein said reciprocating means further comprises a spring element, one portion of the spring element is inserted in a groove of the carrier and another portion of the spring element abuts against and can move along an inner sidewall of the housing.

15. The variable optical attenuator as claimed in claim 11, further comprising at least one fastening means for fixing said optical module and said reciprocating means in said interior space of said housing.

16. The variable optical attenuator as claimed in claim 11, wherein the filter is positioned between the reflector and the collimator.

17. The variable optical attenuator as claimed in claim 11, wherein said screw rod is threadedly engaged with the carrier, and the carrier with the filter moves toward one side or another of the screw rod according to a direction in which the screw rod is rotated.

18. The variable optical attenuator as claimed in claim 11, wherein said at least two adjusting controls is a pair of slots, one positioned at each of the two ends of the screw rod.

19. The variable optical attenuator as claimed in claim 18, wherein each slot is accessable from a different side of the housing and can be operated by a screwdriver.

20. A variable optical attenuator comprising:

a housing;

a filter positioned in the housing, said filter defining a varying optical density gradient along a transverse direction perpendicular to a light path direction;

reciprocating means moving said filter along said transverse direction; and

Two opposite controls disposed and exposed on two opposite transverse sides of the housing along said transverse direction to adjustably move said reciprocating means with accessibility from said two sides, respectively.

* * * * *